Jan. 25, 1944.        C. L. WRIGHT ET AL        2,339,900
                LOADING ATTACHMENT FOR TRUCKS
                  Filed July 1, 1942        3 Sheets-Sheet 1
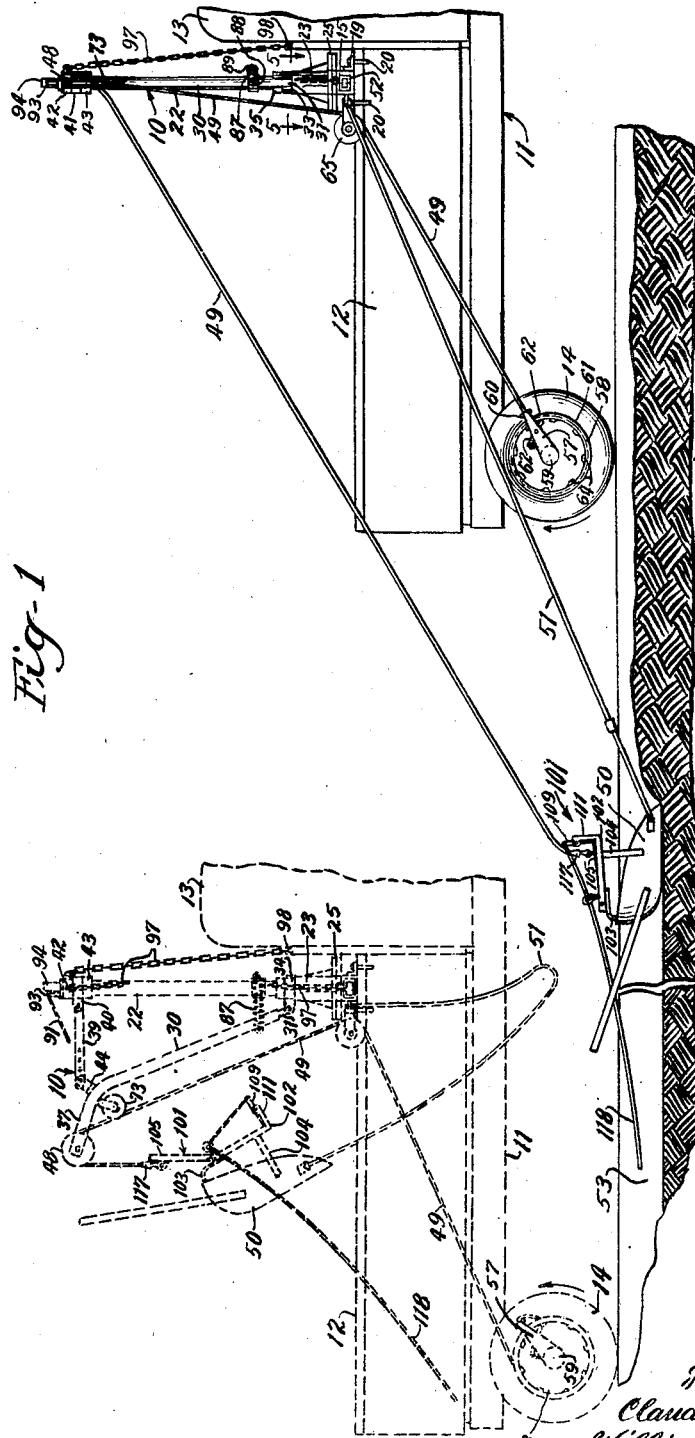

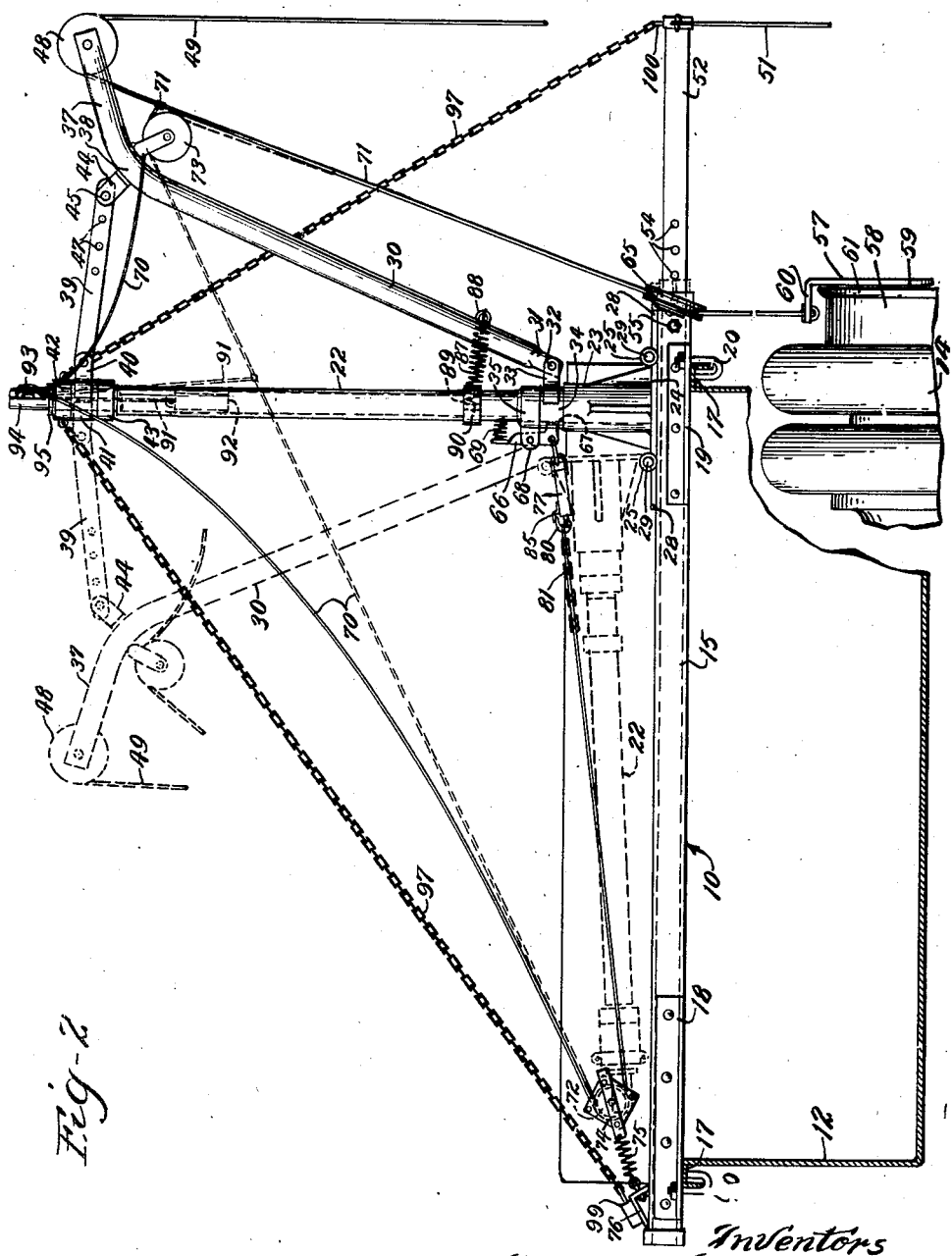

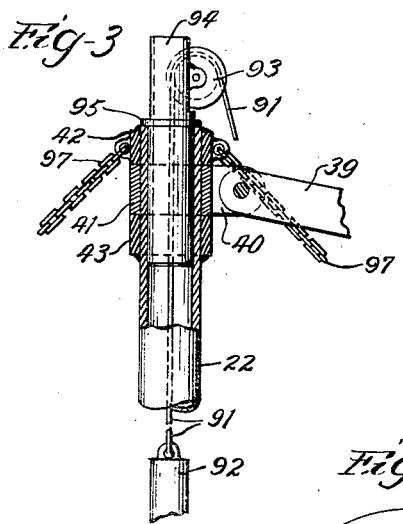
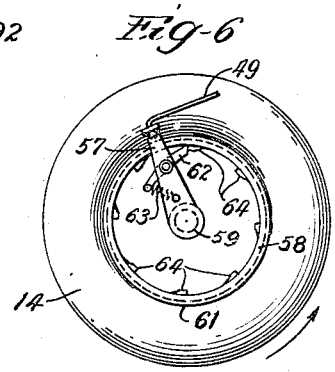
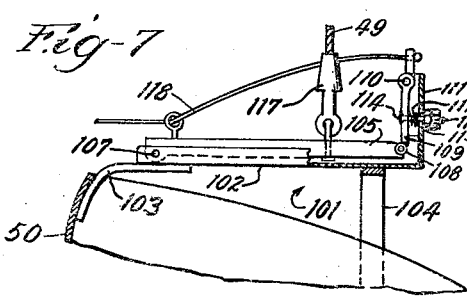
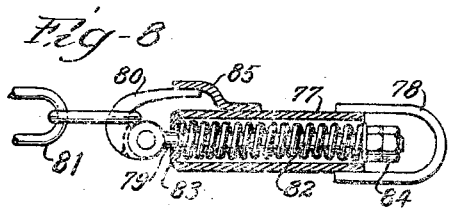
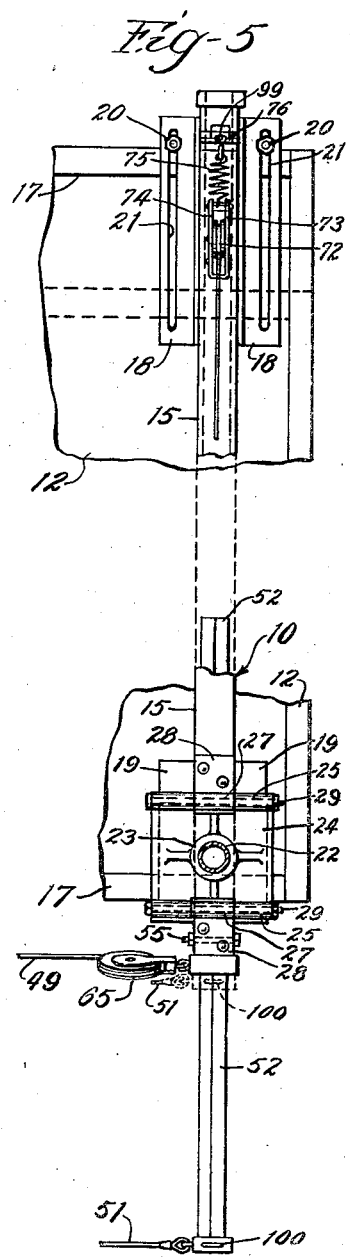

Patented Jan. 25, 1944

2,339,900

UNITED STATES PATENT OFFICE 2,339,900

LOADING ATTACHMENT FOR TRUCKS

Claude L. Wright and William H. Holland, Harper, Oreg.

Application July 1, 1942, Serial No. 449,274

27 Claims. (Cl. 214—81)

Our invention relates to a loading attachment for trucks and is more particularly concerned with an apparatus arranged to be carried by a dump truck for picking up and loading material into the truck.

One of the principal objects of our invention is to provide an apparatus constructed as a unit to be carried and operated directly by the truck to be loaded.

Another object is to provide a loading apparatus of this type which is adapted to gather up material from or adjacent to the ground level in response to movement of the associated truck in one direction, and which is arranged to be actuated by movement of the truck in the opposite direction for loading the material into the truck.

A further object is to provide in apparatus of this kind an actuating mechanism which is operated by a drive wheel of the associated truck.

Still another object of the invention is to provide novel means in a loading attachment for trucks for automatically swinging a hoisting boom to and from material pick-up and truck-loading positions.

Another object is to provide an over-run release mechanism for the boom-swinging means.

Another object of the invention is to provide a loading attachment for trucks which is particularly well adapted for ditching and scraping operations.

Other objects and advantages of our invention will appear more fully from the following description and from the accompanying drawings, in which similar characters of reference indicate similar parts throughout the several views.

Figure 1 is a fragmentary side elevational view of a truck equipped with a loading attachment embodying the features of our invention;

Fig. 2 is an enlarged fragmental transverse vertical sectional view through the truck body, looking forwardly, and showing the loading attachment in elevation;

Fig. 3 is a fragmentary detail view in vertical section of the upper end portion of the boom-supporting mast and associated structure;

Fig. 4 is a top plan view of the mast;

Fig. 5 is a fragmental enlarged horizontal sectional detail view, taken substantially along the line 5—5 of Fig. 1;

Fig. 6 is an enlarged side elevational view of the driving wheel of the truck and the winding-drum structure for the hoisting cable;

Fig. 7 is an enlarged elevational detail view, partially in section, of the dumping latch and trip mechanism for the scraper bucket; and Fig. 8 is an enlarged detail view of the automatic overload safety release mechanism for the swing line.

The truck loading attachment of our invention is preferably constructed as a complete, substantially self-contained unit which is adapted to be mounted on the body of a truck. A mast structure carries a swinging boom and pulley for a cable by which a material-engaging and handling member such as a scraper bucket is adapted to be hoisted from a material gathering position at the side of the truck to a truck loading position for dumping the bucket contents into the truck. Motion of the truck in one direction is utilized to operate the hoisting cable to draw the bucket up to the loading position, and motion of the truck in the opposite direction is utilized to return the bucket to the material-gathering position and to drag the bucket along for scraping up a load of material.

As shown in the drawings, a loading attachment 10 embodying the features of our invention is associated with a light dump truck 11, having a conventional tail-gated sheet metal dump body 12, a driver's cab 13, and rear driving wheels 14. Inasmuch as various makes of trucks vary as to specific details, a conventionalized, more or less diagrammatic illustration of the truck 11 has been adopted for the present purpose.

The loading attachment 10 is preferably mounted directly upon the forward end portion of the body 12 immediately behind the cab 13 and for this purpose has an elongated base 15 which extends entirely across the body 12 and rests removably upon downwardly open side beads 17 which reinforce the upper edges of the body sides. Lightness of weight combined with maximum strength are obtained in the base 15 by constructing it in the form of a square steel tube of relatively small cross-section and equipped with laterally extending wing plates 18 adjacent the left end, and similar though preferably shorter wing plates 19 adjacent to the right end, co-planar with the bottom face of the base bar and engageable with the tops of the respective beads 17. The wing plates 18 and 19 may be formed from simple angle bar strips with the vertical angle permanently secured to the sides of the base bar.

Appropriate means such as J-bolts 20 carried by the wing plates 18 and 19 removably engage under the side beads 17 for securing the base 15 firmly in place upon the truck body. In order to adapt the base 15 for mounting upon truck bodies of various widths, the wing plates 18 may be formed with longitudinal slots 21 for adjustably shifting the associated attaching bolts 20 to accommodate any particular truck width within a substantial range. In the upper part of Fig. 5, two different truck widths are exemplified in full and dash outline, respectively.

Extending up from the base bar 15, preferably adjacent to the right side of the truck over the wing plates 19, is a vertical shaft or mast 22 of tubular construction. The mast 22 is supported by a base or pedestal 23 in the form of a vertical socket having a buttress-ribbed, welded attachment to a base plate 24 adapted to rest upon the upper face of the supporting base bar 15. A detachable, hinged connection of the plate 24 to the base bar 15 is provided by equipping the plate 24 with an axially alined and spaced pair of identical hinge curls or tubes 25 along each of the opposite side edges at right angles to the bar 15 for receiving coaxially between their opposing ends respective hinge curls or tubes 27 carried by hinge plates 28 which are secured fixedly to the upper face of the base bar 15. Tie bolts 29, serving as hinge or connecting pins, are secured through the respectively aligned hinge curls or tubes 25 and 27. While through this convenient arrangement the pedestal is provided with hinges at both sides, as a practical matter the outer or right side hinge will most generally serve merely as a connector, with the hinging function exercised by the inner or left side hinge when it becomes desirable to tip or fold the mast 22 over from the upright full-line position shown in Fig. 2 to the broken line or folded-down position for convenience in transportation or to clear overhead structures under which the truck must pass.

The primary function of the mast 22 is to support an upwardly and outwardly extending hoisting boom 30. In the present instance, the boom 30 is formed of tubular material and has its lower end flattened, as at 31, for convenience in pivotally connecting it by means of a pin 32 between a pair of vertically parallel, horizontally extending ears 33 fixed upon a swivel collar 34 which is slidably rotatable about the mast 22. The collar 34 is held against axial shifting between the upper edge of the pedestal 23 and a fixed collar 35 on the mast. Adjacent its upper end, the boom 30 is curved outwardly to provide an overhanging head 37 which joins the main body of the boom at a curved shoulder 38.

A swivel connection of the head end of the boom 30 with the mast 22 is provided by a connecting bar 39 which at the mast end is pivotally connected between ears 40 of a slidably rotatable swivel collar 41 (Figs. 2 and 3), supported between fixed upper and lower collars 42 and 43, respectively, on the upper end portion of the mast 22. At its boom end, the connecting bar 39 is received between fixed ears 44 extending upwardly and away from the boom shoulder 38 and to which the bar is connected adjustably by means of a pin 45 carried by the ears, and extending into any selected one of a series of spaced pin apertures 47 in the bar. In this way the distance to which the boom head 37 extends away from the mast 22 can be adjusted within limits.

At the outer end of the boom head 37 is mounted a pulley 48, rotatable upon a horizontal axis. This pulley has trained thereover a hoisting cable 49, one end of which is connected to a slip scraper bucket 50 (Fig. 1).

In the main, the scraper bucket 50 is of conventional design and has connected thereto one end of a drag cable 51, the other end of which is secured to the outer end of a drag bar 52 which extends out from the side of the truck 11 far enough to enable gathering up of material by the bucket 50 at a fair distance laterally from the truck, in response to a forward pull on the drag cable 51 by driving the truck forwardly. This renders the device suitable for road grading purposes such as scraping and cleaning out a roadside drainage ditch 53, as indicated in Fig. 1. The bucket 50 may be formed in any preferred shape for special ditching operations. Many other loading uses for this arrangement will also readily suggest themselves.

Longitudinal extension of the drag bar 52 is effected by constructing it in the form of a rectangular tube having its outside dimension proportioned with respect to the inside dimensions of the base bar 15 to permit telescoping of the drag bar within the end of base bar (Figs. 1, 2 and 5). Through this arrangement the drag bar 52 may be extended for working and may be completely retracted to the dot-dash position shown in Figs. 2 and 5, when not working, or when it might form an objectionable protrusion as when the truck is traveling some distance from one site to another.

A plurality of selective extended positions of adjustment of the drag bar 52 are provided for by forming it with a graduated series of horizontally transverse apertures 54 adapted to receive a securing bolt 55 extending through the associated end of the base bar 15. Thus, by selection of the appropriate bolt hole 54 to receive the bolt 55, the proper extended position is attained in the drag bar for particular working conditions.

The height of the boom head 37 is such above the truck body 12 that the bucket 50 can easily and conveniently be raised to clear the sides of the truck body 12 by pulling the hoisting cable 49 over the pulley 48. Then by swinging the boom 30 about the mast 22 in over the truck, as, for example, from the full-line position shown in Fig. 2 to the broken line position, the material carried by the bucket can be dumped into the truck. After dumping the bucket contents, the boom 30 is again swung back to the overside position and the bucket lowered to scraping position by paying out the hoisting cable 49.

According to the present invention, both hoisting and paying out of the bucket 50 are effected by operation of the truck. More particularly, hoisting is effected by driving the truck in one direction, and return or paying out is effected by driving the truck in the opposite direction. No special transmission or gearing is used on the truck, but the hoisting cable 49 is connected in a simple manner for operation by the drive wheels of the truck.

For this purpose, the pull end of the hoisting cable 49 is secured to an arm 57 which is adapted to guide the hoisting cable for winding upon a reel drum 58 in response to rotation of the drive wheel 14 at the right side of the truck. The arm 57 is secured, as at 59 (Fig. 2) for free rotation about the axis of the hub of the wheel. The drum 58 is secured fixedly in any prferred manner coaxially with the hub directly to the wheel for rotation therewith. The over-all outside diameter of the drum 58 is preferably approximately the same as the wheel proper, without the tire. The arm 57 is adapted to swing freely in slightly spaced relation to the outer edge of the drum 58, and has an inwardly extending flange 60 at its free end which serves as the anchorage for the hoisting cable 49. A peripheral bead 61 is provided along the outer edge of the drum to retain the cable as it is wound upon the drum.

Means is provided for automatically connecting the arm 57 for rotation with the drum 58 to wind the hoisting cable 49 upon the drum and thus pull up the bucket 50 to truck-loading position as an incident to rotation of the drum by movement of the truck 11 in one direction. On the other hand, the hoisting cable is paid out upon reversal of rotation of the drum by movement of the truck in the opposite direction. Eventually, after a certain amount of forward rotation of the drum, the cable 49 is all paid out and the arm 57 disconnects from the drum which may then continue to rotate freely with the wheel 14 while the arm is held substantially stationary by the fully paid out hoisting cable and the bucket 50 may be dragged to scrape up another load of material.

Such automatic connecting means herein comprises a pawl-and-ratchet mechanism comprising a pawl 62 pivotally mounted on the inner face of the arm 57 (Figs. 1 and 6) and urged by a tension spring 63 into engagement with the inner periphery of the drum 58 which carries a series of equally spaced apart ratchet teeth 64. The arrangement is such that upon reverse movement of the wheel 14 as indicated by the arrow in Fig. 6, the pawl will engage the nearest advancing tooth 64. This interlocks the arm and the drum and causes the arm to be carried around with the reversely rotating drum, thus pulling the hoisting cable 49 and guiding it to wind upon the drum. In Fig. 6 is shown the relative position of the arm and drum near the beginning of the wind-up operation, and the dot-dash position in Fig. 1 illustrates the completion of the wind-up.

Upon again driving the truck forward, the hoisting cable 49 is unreeled from the drum 68. When the cable has been fully paid out, the arm 57 will cease to follow the drum 58 but will remain in approximately the position shown in full outline in Fig. 1 where it is held by the cable, which is preferably of such length as to be substantially free from slack when the bucket 50 is in material-gathering position. Then the pawl 62 freely cams over the teeth 64 in the continued forward movement of the truck incident to dragging the bucket 50 for scooping up a load of material. When the loading apparatus is not in use, the pawl 62 is disconnected or tied down to be inactive, and the hoisting cable 49 is tied up to hold the arm 57 against swinging.

Means for guiding the hoisting cable 49 from the pulley 48 to the arm 57 may comprise a pulley 65 (Figs. 1, 2 and 5) secured to the rear face of the forward end of the base bar 15, in substantially centered radial alignment with the drum 58. This assures proper winding and unwinding of the cable upon the drum 58, even though the pulley 48 is movable through a wide arc at a substantial distance from the drum during operation of the apparatus.

In order to hold the boom 30 in the laterally extended or overside position during operation, a quick-releasable latch 66 (Fig. 2) is mounted for engagement within a radial, longitudinally extending latching slot 67 in the lower swivel collar 34 of the boom. As shown, the latch 66 is intermediately pivoted in a vertical position between ears 68 extending radially from the fixed retaining collar 35 on the mast and has a compression spring 69 bearing outwardly against its upper portion to force the lower inwardly directed end of the latch into engagement with the swivel collar for automatically finding the latching slot 67 when the boom 30 has been swung out fully to the overside position.

Release of the latch 66 for then swinging the boom 30 to carry the scraper bucket 50 into the truck-loading position over the truck body 12, is effected automatically as an incident to hoisting of the scraper bucket. For this purpose, a cable 70 (Fig. 2) is secured at one end to the latch 66 adjacent to its latching end, and at its other end is spliced as at 71 to the hoisting cable 49 at a point which is adjacent to the boom pulley 48 when the hoisting cable has been fully paid out. The cable 70 is trained over a pulley 72 near the left end of the base 15 and passes rearwardly of the boom 30 and over a pulley 73 mounted behind the boom shoulder 38 inwardly from the pulley 48. The pulley 72 is mounted in a block 74 which is resiliently secured by a shock-absorbing tension spring 75 to a fixed anchoring angle 76 carried by the top of the adjacent end of the base bar 15.

The length of the cable 70, and its relation to the boom cable 49, are such that until the hoisting cable is reeled in from the fully paid out condition sufficiently to raise the bucket substantially from the ground, the cable 70 remains slack, the completely slack condition being shown in full outline in Fig. 2. At a predetermined point, the cable 70 is then drawn taut as shown in broken outline in Fig. 2. Continued reeling in of the hoisting cable 49 pulls on the cable 70 and causes it to release the latch 66, permitting the boom to swing around to the truck loading position when the bucket 50 is hoisted up to where it will clear over the side of the truck body 12.

The latch-releasing cable 70 serves also as means for automatically swinging the boom 30 to the dumping position. Thus, after the latch 66 has been released, and tension on the cable 70 increases by continued reeling in of the hoisting cable 49, a steady inward pull is exerted by the cable 70 on the pulley 73 which swings the boom 30 over to the truck-loading position. Such position may, as shown in broken outline in Fig. 2, be over the center of the truck.

Should the tension on the cable 70 continue beyond a predetermined amount after the boom has been swung all the away around, as, for example, when the truck accidentally overruns rearwardly, an automatic overrun release device 77 (Figs. 2 and 8) acts to relieve the tension. Such device is interposed at any suitable point in the cable or, as shown, between the latch 66 and the attached end of the cable. In the present instance, the cable release device 77 comprises a tubular body having a bail 78 at one end connected with the latch 66. From the opposite end of the tubular body extends a stem 79 carrying a pivoted, off-center latch link 80, which engages the adjacent end of a leader chain 81 connected to the cable. A compression spring 82 housed within the body of the device 77 works between a fixed end abutment 83 and a tensioning lock nut assembly 84 on the opposite end of the stem 79, to draw in and hold the free end of the latch link normally engaged in closed condition under a latch plate 85. Under abnormal or overload tension of the cable 70, the spring 82 is compressed, allowing the stem 79 to move out axially beyond the end abutment 83 until the latch link 80 leaves the latch plate 85. Thereupon the latch link 80 cams open under the pull of the associated leader chain link, releasing the latter and thereby the cable, which falls slack. This calls the attendant's attention to the overrun so that he may take steps to stop and correct the abnormal condition.

To reset the overrun release, the leader chain is re-engaged upon the latch link 80 which may be re-engaged under the latch plate 85 from the side by turning as permitted by rotation of the stem 79, or by compressing the spring 82 until the free end of the latch link can be re-inserted under the latch plate, expansion of the spring then drawing the link into latched position. The spring 82 draws the latch link 80 inwardly sufficiently to allow, of course, for adequate shock take-up before overrun release of the latch.

Upon paying out of the hoisting cable 49 by forward movement of the truck to return the bucket 50 to scraping position, the boom 30 is automatically swung back from the truck-loading position to the overside position by means such as a counterbalancing or return spring 87 (Figs. 1 and 2). This spring has one end attached to the boom 30 through the medium of an eye 88 near the outer side of the boom, and has its other end secured to a radially forwardly extending anchoring ear 89 on a collar 90 fixedly supported by the mast 22. Through this arrangement, as the boom is swung around to the truck-loading position, the return spring 87 is gradually placed under increasing tension. Then, as the latch releasing swing cable 70 is gradually paid out with the hoisting cable 49 in the forward movement of the truck 11, the return spring 87 gradually swings the boom 30 back to the overside position. Should the overrun cable release device 77 be forced to operate, the return spring 87 will, of course, be left free to return the boom at once.

After the latch releasing swing cable 70 has been fully paid out, the substantial slack thereof is preferably taken up to avoid entanglement of the cable with other parts of the apparatus. Means for this purpose may comprise a slack take-up cord 91 (Figs. 2, 3 and 4), which is secured at one end to the cable 70 and at its other end is attached to a counterweight 92 adapted to ride freely up and down within the tubular mast 22, much like a sash weight. An anti-friction roller or pulley 93 for the take-up cord 91 is carried by a swivel mount 94, which may be in the form of a short tubular member rotatably slidable within the upper end portion of the mast 22 and having a thrust bearing collar 95 which rests slidably upon the upper end of the mast. Thus, by swivelling of the mount 94, the pulley 93 is adapted to follow the swinging movements of the boom 30.

To resist the load imposed upon the top of the mast 22 by the boom 30 and the bucket 50, guy cables or chains 97 are provided, which are secured at their upper ends to the top collar 42 on the mast. One of the guy chains 97 is secured to the truck body, as at 98 (Fig. 1), another of the chains is secured to an eye anchor 99 on the anchoring angle 76 upon the base bar 15 (Fig. 2), and the remaining guy chain 97 is adjustably secured to an anchoring eye 100 (Figs. 2 and 5) at the top of the outer end of the drag bar 52. All of the guy chains 97 are, of course, readily detachable to permit collapse of the mast when it is to be placed out of use.

Dumping of the bucket 50 after it has been swung over into truck loading position over the truck body is facilitated by a novel dumping latch mechanism, indicated generally by the numeral 101 (Figs. 1 and 7). As shown, the mechanism 101 includes a longitudinally extending upwardly opening channel-shaped member 102 carried by a frame secured over the bucket 50 and including a rear bracket 103 and a front bail 104 straddling and secured to the sides of the bucket. Normally lying longitudinally within the channel member 102 is a substantially coextensive trip bar 105 which is pivotally attached near its rear end as at 107 between the upstanding flanges of the channel member. At its forward end, the bar 105 carries an anti-friction roller 108 which is adapted to be engaged by the lower end of trip latch 109 intermediately pivotally attached as at 110 between the parallel flanges of an upstanding channel shaped latch support 111 rigid with the forward end of the channel member 102. A tension spring 112 bears against the trip latch 109 below the pivot 110 to push the lower end of the trip latch normally into overlying engagement with the roller 108. Adjustment of the extent to which the spring 112 pushes the trip latch 109 into latching engagement with the roller 108, and thus the sensitivity of the trip mechanism, is effected through the medium of a lock nut adjusting assembly 113 threaded onto a stud 114 which projects from the trip latch through the spring 112 and out through a slot 115 in the web of the latch support 111.

The hoisting cable 49 is secured through the medium of a knuckle member 117 to the trip bar 105 at a point spaced a short balanced distance rearwardly from the anti-friction roller 108. Thus, with the trip bar 105 held as shown in Fig. 7 within the horizontal channel 102, the bucket 50 can be hoisted up in a horizontal condition with a full load to the truck-loading position. Then the bucket may be dumped by releasing the trip latch 109 by swinging it about the pivot 110 in opposition to the latch spring 112 by pulling on a trip cord 118 secured adjacent to the upper end of the trip latch and adapted to be manipulated by the attendant after the bucket has been swung into position to be dumped. Instantly upon release, the trip arm 105 swings down at its rear end under the weight of the bucket and allows the bucket to tip forwardly and discharge its load, substantially as shown in broken outline in Fig. 1. After the bucket 50 has been returned to the ground and comes to rest thereon in a horizontal position so that its weight is released from the trip arm 105, the latter can be reset by swinging it down with the anti-friction roller 108 riding along the opposed face of the trip latch 109 until the arm comes to rest in relatched position.

Operation of our truck-loading apparatus 10, it will thus be apparent, is automatic in all phases except for guidance of the bucket 50 while gathering up material which must be under the control of an attendant for uniformity of results and also to observe when the bucket is loaded and to give directions to the driver of the truck. The attendant must, of course, also operate the trip cord 118. Aside from these actions, all operations of the apparatus are effected by forward or rearward movement of the truck 11. It will be apparent that since the truck moves in reverse to effect winding of the cable 49 on the drum 58 and thus hoist the bucket to dumping position, forward movement for the same distance of travel will return the bucket to approximately the same spot from which it was raised so that there will be no gap in the finished line of scraping.

While the invention is susceptible of various modifications, and alternative constructions, we have shown in the drawings, and have herein described in detail certain preferred embodiments, but it is to be understood that we do not thereby intend to limit the invention to the specific forms disclosed, but intend to cover all modifications and alternative constructions falling within the spirit and scope of the invention as expressed in the following claims. For example, the loading attachment may also be used with other material handling devices such as rock tongs or a loading hook in place of the scraper bucket and again the advantages of automatic raising and lowering of the device responsive to movements of the truck. With rock tongs or a loading hook, limited forward running of the truck, after full hoisting by reverse running, may be resorted to for lowering the material or article being loaded into the truck, whereafter the released tongs or hook can be returned in the same manner as described for the scraper bucket to the next pickup point.

This application is a continuation-in-part of our copending United States application for patent, Serial No. 401,010, filed July 3, 1941, and abandoned November 21, 1942.

What we claim as new and desire to cover by Letters Patent of the United States is:

1. In combination with a truck having wheels, a hoist mounted on the body of the truck having a hoist cable, a scraper bucket connected to one end of the hoist cable and adapted to scrape up material as the truck moves forwardly, and means operatively connecting the opposite end of the hoist cable to a wheel of the truck to pull the cable and raise the bucket automatically as an incident to reverse movement of the truck, last said means including an overrunning clutch to permit lowering of the bucket and the forward movement of the truck with the bucket in lowered position without further actuation of the hoist cable.

2. In combination with a truck having wheels, a mast mounted on the body of the truck, a boom connected to said mast, a hoist cable operatively depending from said boom, a scraper bucket connected to one end of said cable, and mechanism connecting the opposite end of said cable to a wheel of the truck for pulling said cable to raise the bucket, only when said wheel rotates in one direction, said mechanism being operative upon rotation of said wheel in the opposite direction to release the cable for return of the bucket to scraping position, and upon return of the bucket to such position automatically disconnecting the cable from said wheel while the wheel continues to rotate in said opposite direction to draw the bucket along for scraping of material thereinto by holding the cable inactive in position for pulling upon reversal of direction of rotation of the wheel.

3. In combination with a truck having wheels, a mast mounted on said truck, a boom connected to said mast, a hoist cable operatively suspended from said boom, a scraper bucket attached to one end of said cable, a drum connected to a wheel of the truck, ratchet teeth on said drum, an arm rotatably mounted on the hub of said wheel adjacent to said drum having its outer end connected to the other end of said hoist cable, and a pawl carried by said arm adapted to operatively engage said ratchet teeth for connecting the drum and arm for common movement upon rotation of said wheel in one direction.

4. In combination with a truck having wheels, a base bar structure mounted transversely of the truck body, means for removably securing the base bar structure to the truck body, a mast mounted on said bar structure, a boom supported by and extending upwardly and outwardly from said mast, a hoisting cable operatively suspended from said boom, a scraper bucket attached to one end of said hoisting cable, a drag bar structure extending from the end of said base bar structure, a drag cable connecting said drag bar structure and said bucket, a drum supported by a wheel of the truck, and means anchoring the remaining end of said hoisting cable adjacent to said drum for winding of the hoisting cable upon the drum in the rotation of the drum with said wheel.

5. In combination with a truck having wheels, a base bar structure mounted transversely of the truck body, a mast mounted on one end of said bar structure, a boom connected to and extending upwardly and outwardly from said mast and adapted for swinging movement about the axis of the mast, a hoist cable operatively suspended from said boom, a scraper bucket connected to one end of said cable, mechanism connecting the opposite end of said hoist cable to a wheel of the truck for pulling said cable to raise said bucket, a pulley suspended from the upper end of said boom, and a swing cable trained over said pulley having one end connected to said hoist cable and yieldably connected to the far end of said base bar structure.

6. In combination in a truck-loading hoisting apparatus including supporting structure mounted upon the body of the truck and a boom supported by said structure adapted to extend beyond the truck body and to swing into position overhanging the body, a material handling device having a hoisting line supported by said boom and adapted to be operated for raising and lowering the handling device relative to the truck body, means operative to swing said boom from the extended position into the overhanging position relative to the truck body during the raising of said device by said hoisting line to a position higher than the body, whereby to bring the handling device into position for unloading material carried thereby into the truck, and a safety device operative to release said boom-swinging means from acting on the boom in response to such over-action as might tend to cause damage to the apparatus.

7. In a substantially self-contained loading attachment for a motor truck, a supporting structure including an elongated base arranged to be secured transversely of the truck body, a mast extending upwardly adjacent one end of said base, a boom supported swingably by said mast and adapted in one position to extend substantially beyond the truck body and in another position to overhang the truck body, a scraping and loading scoop having a hoisting cable supported by said boom and adapted to gather up material coincident with forward movement of the truck, a drag line extending from said scoop and anchored to said supporting structure, means for operating said cable to raise said scoop high enough for dumping into the truck body as an incident to backing-up movement of the truck and for paying out said hoisting cable in the forward movement of the truck, and means for swinging the boom from the extended position into the overhanging position coincident with said raising of the scoop by the hoisting cable for unloading of the scoop into the truck.

8. In combination in apparatus for loading a truck, a material handling member, means for hoisting said member from material-receiving position at one side of the truck into a loading position over the truck including a boom mounted on the truck and adapted to swing from an overside position to the loading position, a cable for swinging the boom adapted to fall slack in one position of the boom and yieldable means for automatically taking up the slack in said cable.

9. In combination in a material handling apparatus for trucks, a mast, a boom supported by said mast for swinging movement from an overside relation to the associated truck to a loading position over the truck, a material handling member, means associated with the boom for raising and lowering the material handling member, separate means for automatically swinging said boom from the overside position to the loading position at the same time that the material handling member is raised, and means for automatically returning the boom to the overside position during lowering of the material handling member.

10. In combination in material-handling apparatus adapted to be carried by a truck which is to be loaded with the material, supporting structure, a boom supported by said structure for swinging movement from a material-gathering position wherein the boom extends beyond one side of the truck to a loading position over the truck, a material-gathering member and a hoisting cable therefor associated with said boom, and means for locking the boom in the material-gathering position having a releasing device arranged to be operated when the material-gathering member is hoisted by the cable for movement into dumping position over the truck by swinging of the boom.

11. Apparatus as set forth in claim 10 in which the lock-releasing device also operates to swing the boom from the material-gathering position to the loading position.

12. In combination in a substantially self-contained loading apparatus for a truck, supporting structure arranged to be mounted upon the truck body and including a movable boom, a scoop having a hoisting cable supported by said boom, operating means associated with a wheel of the truck for raising and lowering the scoop depending upon the direction of movement of the vehicle, drag line means connecting said scoop to said supporting structure for dragging the scoop for gathering up material in the travel of the truck in one direction, and overrunning clutch means arranged to disconnect said operating means from said wheel after said lowering of the scoop, whereby the gathering operation is effected without operation of said cable.

13. In combination with a vehicle having propelling means, a material engaging and carrying member, hoisting means on the vehicle including a connection with said member, and means actuated in response to movement of said propelling means in one direction for operating said hoisting means to raise said member and in the opposite direction for lowering said member to a predetermined extent into material-engaging position and being arranged for automatically disengaging from the propelling means after said member has been thus lowered, whereby to enable continued independent motion of the propelling means in said opposite direction while simultaneously moving the vehicle and said member in the same general direction to pick up a load.

14. In combination with a truck movable in opposite directions, a loading attachment comprising a supporting structure mounted on the truck, a scoop having a hoisting cable associated with said supporting structure and adapted to be operated for hoisting the scoop from scooping position to a position wherein the scoop may be acted upon to dump its contents into the truck, said scoop being adapted for scooping up material in the scooping position responsive to movement of the truck in one direction, and means operative in response to movement of the truck in the opposite direction for operating the hoisting cable to hoist the scoop, last said means including overrunning clutch means whereby the truck can be moved in first said direction to collect material in said scoop without operating the hoisting cable.

15. In combination with a vehicle adapted to be driven in opposite directions and having a part arranged to move in a predetermined direction when the vehicle moves in one of said directions, a hoisting structure including supporting means carried by said vehicle, a material engaging and carrying device adapted to be raised or lowered relative to the surface over which the vehicle is traveling, means movably connecting said device to said supporting means, and means cooperating with said connecting means and so constructed and arranged in cooperation with said movable part of the vehicle that said connecting means will be actuated to raise the carrying device relative to said surface automatically as an incident to the movement of the vehicle in said one direction and lower the carrying device upon movement of the vehicle in the opposite direction.

16. In combination with a wheeled vehicle, hoisting mechanism mounted on said vehicle, a material engaging and carrying device having a hoisting cable which is associated with said mechanism to be operated for raising or lowering the device, and means operatively related to the wheel structure of the vehicle for acting upon the cable to raise said device automatically in response to movement of the vehicle in one direction and to lower said device in response to movement in the opposite direction, said means being arranged to become inoperative after the device is lowered whereby the vehicle can be moved in last said direction to collect material in said device.

17. In combination in hoisting apparatus for a wheeled vehicle, a supporting structure adapted to be mounted upon the vehicle and including hoisting mechanism, a material handling device having a hoisting cable supported by said hoisting mechanism and adapted to be operated for lowering and raising said device relative to the vehicle, and mechanism for operating said cable including cooperative means secured to a wheel of the vehicle, one of said means being arranged for rotation relative to the wheel and the other means being arranged to rotate with the wheel and being connectible to said one means automatically in response to a movement of the vehicle in one predetermined direction whereby to carry said one means therewith and operate said cable for raising said device.

18. In combination with a wheeled vehicle, hoisting apparatus including a supporting structure mounted upon the vehicle and upstanding means carried by the supporting structure, a material handling device having a hoisting cable supported by said upstanding means and adapted to be operated for raising and lowering the handling device, a winding drum structure carried by a wheel of the vehicle, and means cooperating with said drum structure to effect winding of the cable upon the drum structure and thus operation of the cable to hoist said handling device when the vehicle is moved in one direction and to effect unwinding of the cable and thereby lowering of the handling device when the vehicle is moved in the opposite direction, said means being constructed and arranged to become inactive after the cable has been unwound to a predetermined extent in the movement of the vehicle in said opposite direction and the cable being adapted to hold said means in the inactive position until the vehicle moves in said one direction.

19. In combination in apparatus for loading a truck, a material-handling member, means for hoisting said member from material-receiving position at one side of the truck into a loading position over the truck including a boom mounted on the truck and adapted to swing from an over-side position to the loading position, a separate cable for swinging the boom adapted to fall slack in one position of the boom, and a counter-weighted flexible member for automatically taking up the slack in said cable.

20. In combination in loading apparatus adapted to be carried by a truck to be loaded, a truck-mounted supporting structure, a handling device adapted to receive, outside of the truck, a load to be deposited in the truck, means for raising said device to a position higher than the truck, separate means including a cable for effecting movement of the device in a transverse direction over the truck after the device has been elevated, and safety means cooperating with said cable to release the same and allow it to fall slack when subjected to abnormal tension.

21. Truck loading apparatus comprising, in combination, a supporting structure adapted to be carried directly by the truck to be loaded, a handling device adapted to receive, outside of the truck body, a load to be deposited in the truck, means including a line arranged to elevate the handling device from a position below the top of the truck body where the device receives its load to an elevation higher than the top of the truck body, means including a flexible element for shifting the handling device in a transverse direction for bringing the handling device to a proper position for deposit of its contents into the truck, and windup means operative to draw both said line and said flexible element toward it simultaneously, said flexible element having a lag differential so that as said line and said element are drawn in, said element becomes effective to shift the handling device as aforesaid only after said line has operated to elevate the handling device sufficiently to clear the truck body.

22. Truck loading apparatus comprising, in combination, a supporting structure adapted to be mounted directly upon the truck to be loaded, a handling device adapted to receive, at a level below the truck body, a load to be deposited in the truck, means carried by said supporting structure for raising and lowering the handling device between the receiving position and a level higher than the body of the truck, independent means for effecting movement of the handling device in transverse direction over the truck body, and means responsive to movement of the truck and acting directly upon both of said means for actuating both means in coordinated sequence.

23. Truck loading apparatus comprising a derrick structure adapted to be mounted upon the body of a truck and including a boom arranged to extend upwardly and laterally beyond the truck body and to swing into position overhanging the body with the top of the boom substantially spaced thereabove, a material-handling device and a hoisting line therefor supported by the top of the boom and adapted to be operated for raising and lowering the device between an on-the-ground position and another position higher than the truck body, means operative to swing the boom from the laterally extended position into the overhanging position relative to the truck body when said device has been raised high enough by said hoisting line to clear the truck body, whereby to bring the device into position for unloading the material carried thereby into the truck, and means for effecting coordinated actuation of said hoisting line and said boom-swinging means, said last-mentioned means being arranged for operative association with a rotatable component of the truck so as to be motivated to effect said actuation in one direction upon rotation of said component in one direction and in the opposite direction when rotation of said component is reversed.

24. Loading apparatus as defined in claim 23 in which the means for coordinated actuation comprises mechanism constructed and arranged to be operated by rotation of one of the truck wheels.

25. Truck loading apparatus adapted to be associated with a wheeled vehicle, comprising a loading receptacle arranged to collect a load and deliver same into said vehicle, means connecting said receptacle to said vehicle whereby it may be caused to move with said vehicle during movement of the vehicle in one direction to collect a load, winding means associated with a wheel of the vehicle, means connecting said winding means to the wheel whereby it is positively driven by said wheel during opposite movement of the vehicle and is permitted to follow said wheel and to remain stationary relative to said wheel during movement of the vehicle in first said direction, and cable means connecting said winding means to said receptacle for elevating and translating said receptacle to a position over said vehicle during said opposite movement, whereby said receptacle is returned to load-collecting position by movement in first said direction and the cable remains inoperative during the load-collecting movement in first said direction.

26. In combination with a vehicle having a wheel, a material engaging and carrying member, hoisting means on the vehicle including a connection with said member and with said wheel, and means actuated in response to movement of the wheel in one direction for operating said hoisting means to raise said member and in the opposite direction for lowering said member to a predetermined extent into material-engaging position and being arranged for automatically disengaging from the wheel after said member has been thus lowered, drag means independent of said hoisting means for connecting said material-engaging and carrying member to the vehicle, whereby to enable continued independent motion of the vehicle in said opposite direction while simultaneously moving the vehicle and said member in the same general direction to pick up a load.

27. In combination in a hoisting apparatus for a wheeled vehicle, a supporting structure adapted to be mounted upon the vehicle and including hoisting mechanism, a material handling device having a hoisting cable supported by said hoisting mechanism and adapted to be operated for lowering and raising said device relative to the vehicle, a cable independent of said hoisting mechanism connecting said material handling device to the vehicle whereby it may be dragged along the ground to collect a load, and mechanism for operating said hoisting cable including cooperative means secured to a wheel of the vehicle, one of said means being arranged for rotation relative to the wheel and the other means being arranged to rotate with the wheel and being connectable to said one means automatically in response to a movement of the vehicle in one predetermined direction whereby to carry said one means therewith and operate said cable for raising said device.

CLAUDE L. WRIGHT.
WILLIAM H. HOLLAND.